March 5, 1929.  J. J. KERMODE  1,704,506
APPARATUS FOR MAINTAINING THE TEMPERATURE
OF OIL WITHIN PREDETERMINED LIMITS
Filed June 27, 1928
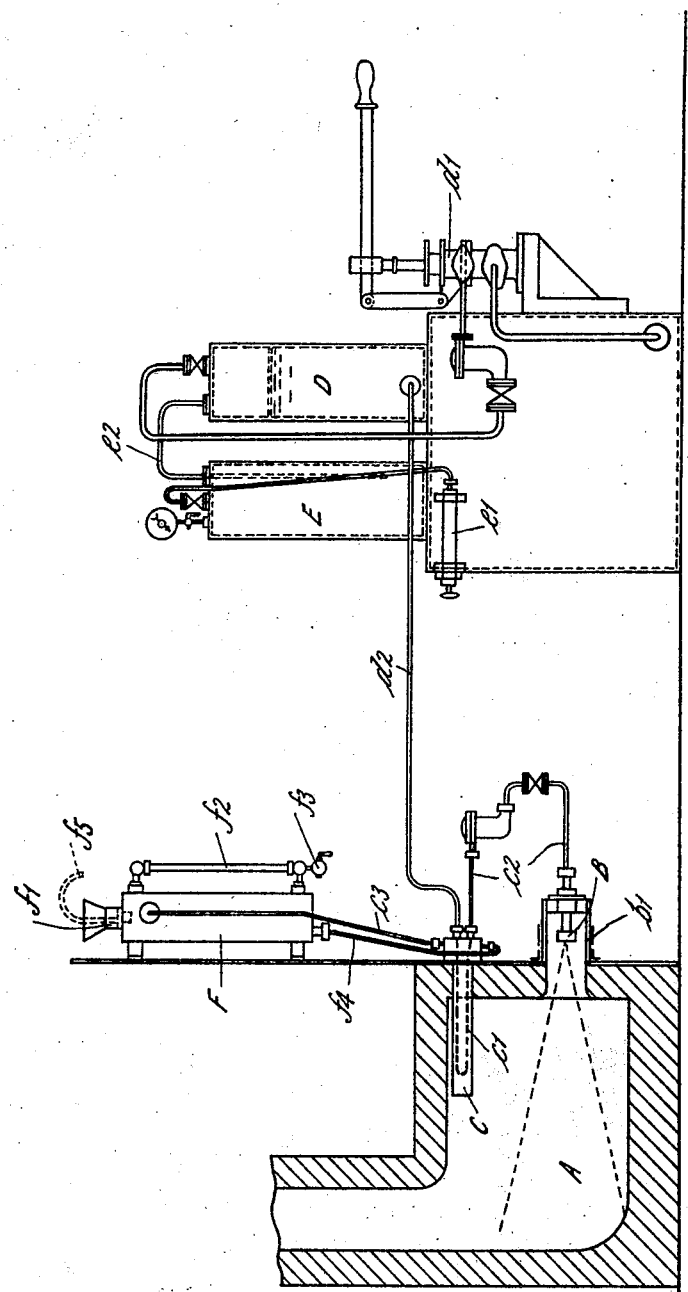

Patented Mar. 5, 1929.

1,704,506

UNITED STATES PATENT OFFICE.

JOHN JONATHAN KERMODE, OF LIVERPOOL, ENGLAND.

APPARATUS FOR MAINTAINING THE TEMPERATURE OF OIL WITHIN PREDETERMINED LIMITS.

Application filed June 27, 1928, Serial No. 288,754, and in Great Britain May 2, 1927.

This invention relates to an improved method of and apparatus for maintaining the temperature of oil or other liquid within predetermined limits; the invention is generally applicable for such purposes, and is specially applicable for regulating the temperature of fuel oil supply to liquid fuel burners, and particularly for regulating the temperature of fuel oil supply to liquid fuel burners of military or the like portable kitchens.

According to the invention the supply of oil is led through the heat exchanging surfaces of an oil heater subjected to a temperature higher than the maximum oil temperature desired, said heat exchanging surfaces being maintained immersed in a liquid subject to atmospheric pressure, the boiling point of which at atmospheric pressure does not exceed the said maximum oil temperature.

In the preferred arrangement the liquid in which the heat exchanging surfaces are immersed is circulated between the oil heater and a control tank the top of which is open to the atmosphere, and through the casing of which heat is usually radiated from the liquid, means being provided whereby the total quantity of liquid so circulated may be regulated to give the desired temperature to the liquid and therefore to the oil passing through the said heat exchanging surfaces. Apparatus for maintaining the temperature of an oil supply to liquid fuel burners within predetermined limits comprises an oil heater located in the furnace to which the oil burners are fitted, or in the flue thereof; heat transmitting surfaces in the oil heater over which surfaces the oil passes on its way to the burner; a control tank connected to the oil heater and containing a liquid which is circulated between the control tank and the oil heater and in contact with the heat exchanging surfaces; and means for regulating the quantity of water in the control tank.

The connections between the oil heater and the control tank are preferably such as to produce the circulation between these two vessels by thermostatic action whilst permitting the quantity of water in the control tank to be varied.

An arrangement particularly suitable for controlling the temperature of oil supply to liquid fuel burners of a portable kitchen such as an army kitchen or the like comprises, a tank for daily supply of oil, an air reservoir communicating with the upper portion of the said tank, the outlet from the tank being connected to the inlet to the heat exchanging surfaces of the oil heater, the outlet of the latter being connected to the oil fuel burners; the oil heater being placed in the grate or flue of the portable kitchen, and the control tank being located outside the apparatus at a higher level than the said oil heater, the upper end of the control tank being open to the atmosphere, and means being provided for varying the quantity of water in the tank; a water level gauge being fitted so that the head of water in the control tank may be observed. With this arrangement the temperature to which the oil is raised before it passes to the burners may be regulated, whilst the immersion of the heat exchanging surfaces in the water subjected to atmospheric pressure ensures that the maximum temperature of the oil shall not exceed 212° F. which is lower than the temperature at which the oil is subjected to what is known as "cracking".

The invention is, by way of example, illustrated in the accompanying drawing, which is largely diagrammatic.

A is the furnace to be heated, which in the present instance is a grate of a portable kitchen. B is the liquid fuel burner therefor located in a suitable casing $b^1$. C is the oil heater, the heat transmitting surfaces of which conveniently may be a U-tube $c^1$. D is a tank which provides the daily supply of oil, which tank is replenished by means of a hand-operated oil pump $d^1$. E is an air reservoir at which an approximately consistent air pressure is maintained by means of the pump $e^1$. The reservoir communicates by means of the pipe $e^2$ with the top of the oil tank D and from the bottom of the latter a pipe $d^2$ is led to the inlet of the heat transmitting surfaces $c^1$, the outlet of the latter being connected by a pipe $c^2$ to the burner B. F is the control tank adapted to be charged with water through an opening $f^1$ through which the interior of the tank is always open to atmospheric pressure; $f^2$ is a water level gauge fitted with a drain cock $f^3$. The lower part of the control tank is connected by the pipe $f^4$ to the lower part of the oil heater C, and the upper part of the interior of the oil heater is connected by a pipe $c^3$ to the upper part of the control tank; the lower end of the pipe $c^3$ entering the control tank being carried well down towards the bottom of the tank.

Where the control tank inlet is closed by a plug the said plug is fitted with a vent pipe as shown in dotted lines at $f^5$.

The action is as follows:—the control tank is preferably located at a higher level than the oil heater, and as the water in the control tank is subject to atmospheric pressure and temperature it is colder than that which surrounds the heat exchanging surfaces in the interior of the oil heater. The cooler water passes down the pipe $f^4$ and displaces the hotter water in the oil heater which rises through the pipe $c^3$ to the control tank; circulation between the control tank F and the oil heater C is thus maintained. The circulating water loses some of its heat by radiation, and may be in part evaporated, and it will be seen that its temperature may within limits be made to depend upon the quantity of water in circulation, that is to say, upon the head water in the control tank F; if, however, the temperature to which the oil heater is subjected is sufficient to boil the circulating water the temperature of the oil passing through the heat transmitting surfaces cannot in such event exceed 212° F. so long as the oil heater contains water. The level of water in the control tank is shown by the gauge glass, and the attendant preserves the water in the control tank at the level at which the apparatus is designed to work.

Where a supply of pressure water is available, a filling tap may be fitted to replenish the water in the control tank, or this may be done by hand through a funnel-like filler. Where a constant water supply is available the control tank may be arranged to be filled to a given level through a cistern fitted with a float control; or the control tank may consist of a cistern fitted with a float control valve.

In some cases more than one control tank may be fitted, additional tanks being connected in the circuit where it is desired to increase the quantity of circulating water.

Where oil is supplied which it is desired to raise to a higher temperature than the boiling point of water, a liquid having a higher boiling point than water may be employed.

Any suitable system of oil burning, and any desired type of burner may be employed; preferably, however, the system employed is that now well known as the Kermode system. The arrangements and details of construction are susceptible to considerable modifications within limits of the invention to suit the requirements of different applications.

Having now fully described my invention, I declare that what I claim, and desire to secure by Letters Patent is:—

1. In liquid fuel control apparatus, in combination;—a furnace heated by liquid fuel burners; an oil heater located in the said furnace; heat exchanging surfaces in the said heater the inlet of which is connected to the oil supply, and the outlet of which is connected to the burners; a control tank located outside the furnace, the lower end of which control tank is connected to the lower part of the interior of the oil heater, the upper portion of the latter interior being connected to the control tank through a pipe entering the upper end thereof and extending downwardly within the same; and means for regulating the level of the water in the control tank; substantially as described.

2. In liquid fuel control apparatus, in combination;—a furnace; liquid fuel burners for heating the said furnace; a liquid fuel supply tank; an air reservoir; the interior of which communicates with the upper end of the fuel supply tank; a pump for providing the desired air pressure in the reservoir; an oil heater in the said furnace and having heat exchanging surfaces, the inlet to which is connected to the said oil pump and the outlet from which is connected to the said burners; a control tank located outside the furnace, the lower end of which control tank is connected to the lower part of the interior of the oil heater, the upper portion of the latter interior being connected to the control tank through a pipe entering the upper end thereof and extending downwardly therein; a water level gauge glass on the control tank; and means for regulating the level of water in the control tank; substantially as described.

In testimony whereof I have hereunto set my hand.

JOHN JONATHAN KERMODE.